March 31, 1959  E. C. BRAND  2,879,956
HELICOPTER CONSTRUCTION
Filed Feb. 7, 1955  4 Sheets-Sheet 1

Ellis C. Brand
INVENTOR.

March 31, 1959 E. C. BRAND 2,879,956
HELICOPTER CONSTRUCTION
Filed Feb. 7, 1955 4 Sheets-Sheet 3

Ellis C. Brand
INVENTOR.

BY

March 31, 1959 E. C. BRAND 2,879,956
HELICOPTER CONSTRUCTION
Filed Feb. 7, 1955 4 Sheets-Sheet 4

Ellis C. Brand
INVENTOR.

United States Patent Office 2,879,956
Patented Mar. 31, 1959

2,879,956

HELICOPTER CONSTRUCTION

Ellis C. Brand, Beaumont, Tex.

Application February 7, 1955, Serial No. 486,427

4 Claims. (Cl. 244—17.17)

This invention generally relates to novel and improved helicopter construction and more specifically provides novel and improved structure for driving and controlling the movement of a helicopter.

An object of this invention is to provide a helicopter construction that may be utilized for serving the same purposes as any utilitarian vehicle wherein the helicopter is extremely maneuverable and easily controlled by a single operator whereby the device may be utilized for relatively short trips or the like.

Another object of the present invention is to provide a helicopter having a rotatable propeller means on the upper end thereof together with means for driving the propeller means and varying the angle of the plane of rotation thereof for varying the movement of the helicopter.

Still another important object of the present invention is to provide a helicopter construction having a fuselage that is generally L-shaped with the drive shaft extending through the roof thereof for driving a propeller means together with means for controlling the plane of rotation of the propeller means for directing the flight of the helicopter.

Other important objects of the present invention will reside in its simplicity of construction, ease of use, ease of control, adaptation for its purposes and the relatively inexpensive manufacturing costs and maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
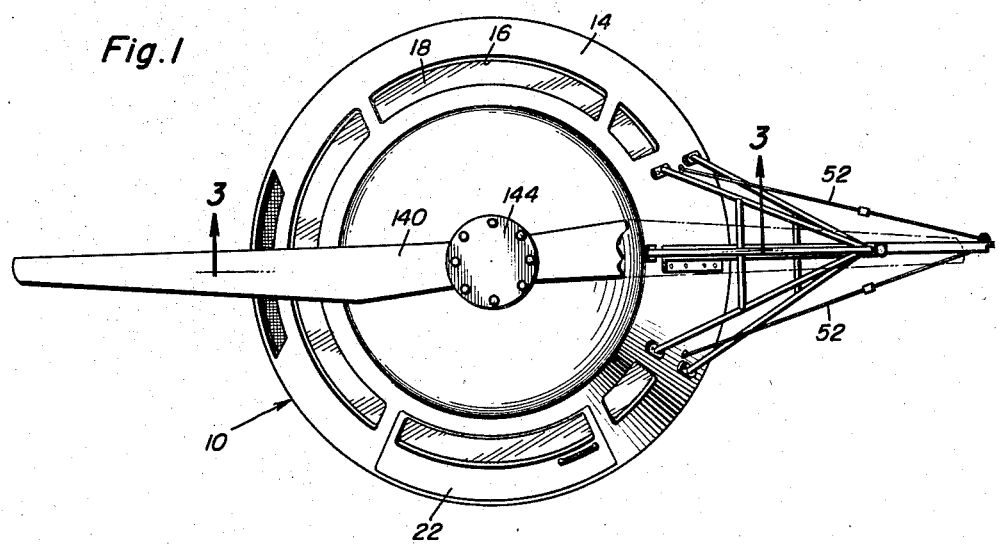
Figure 1 is a top plan view of the helicopter construction of the present invention.
Figure 2:
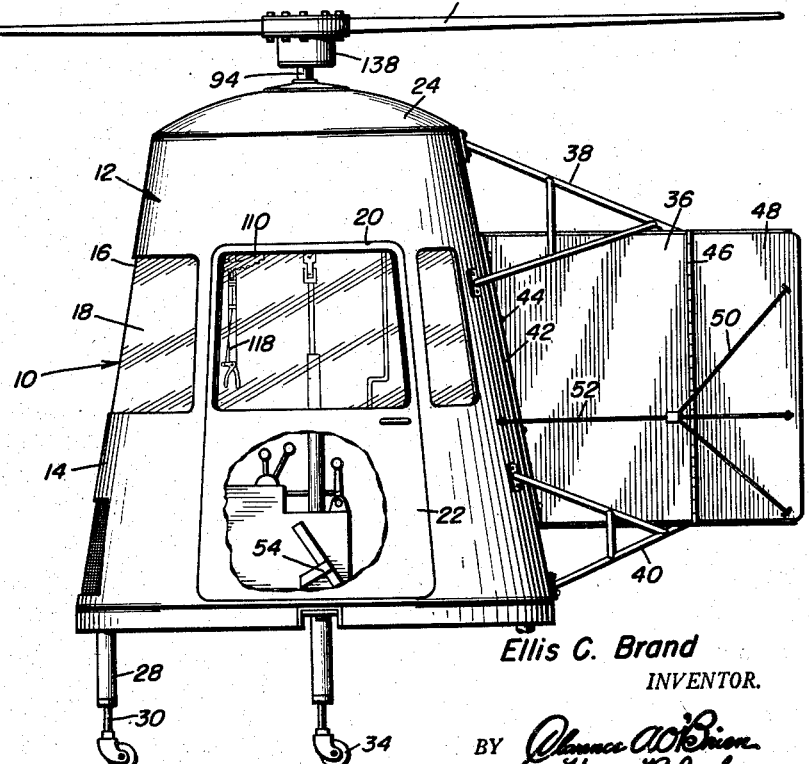
Figure 2 is a side elevational view of the helicopter construction with a portion of the access door being broken away showing the controls for the helicopter.
Figure 3:
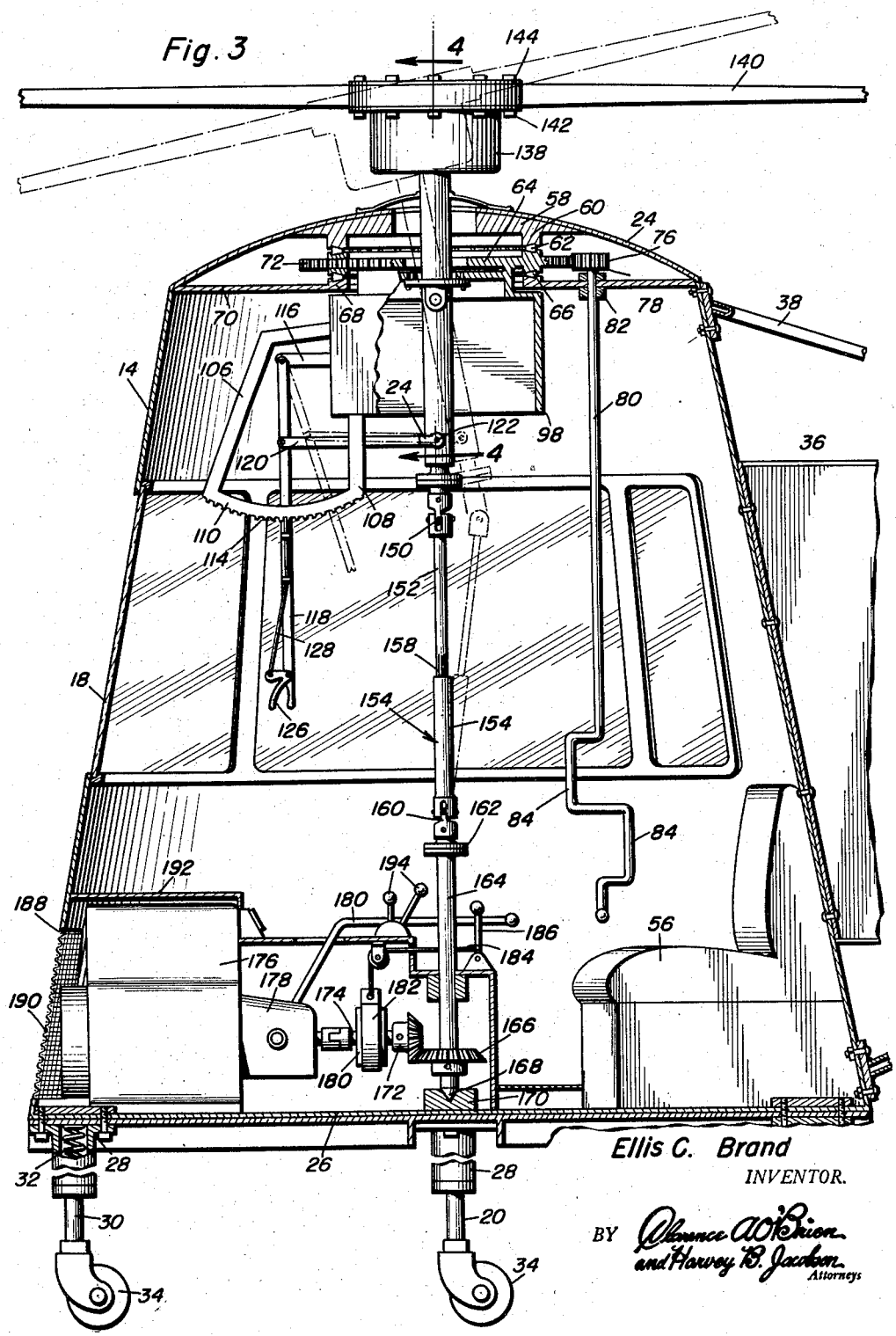
Figure 3 is a longitudinal, vertical sectional view taken substantially upon a plane passing along section line 3—3 of Figure 1 showing the details of construction thereof.
Figure 4:
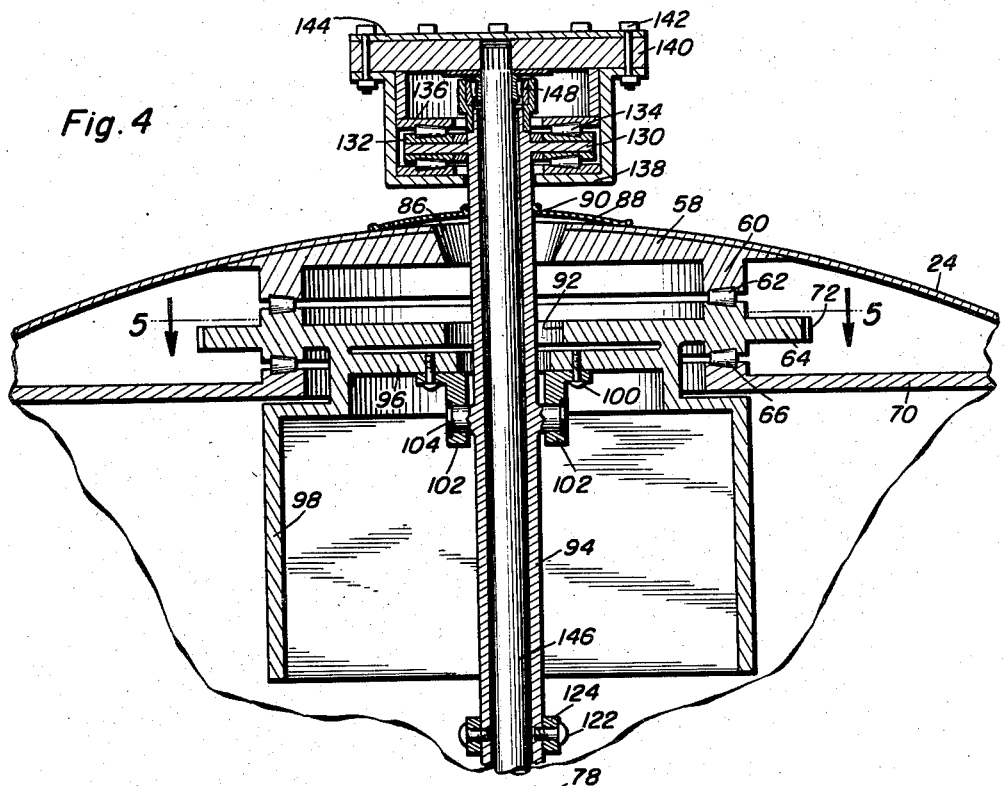
Figure 4 is an enlarged sectional view taken substantially upon a plane passing along section line 4—4 of Figure 3 showing further structural details of the control means for regulating the angle of the plane of rotation of the propeller means.
Figure 5:
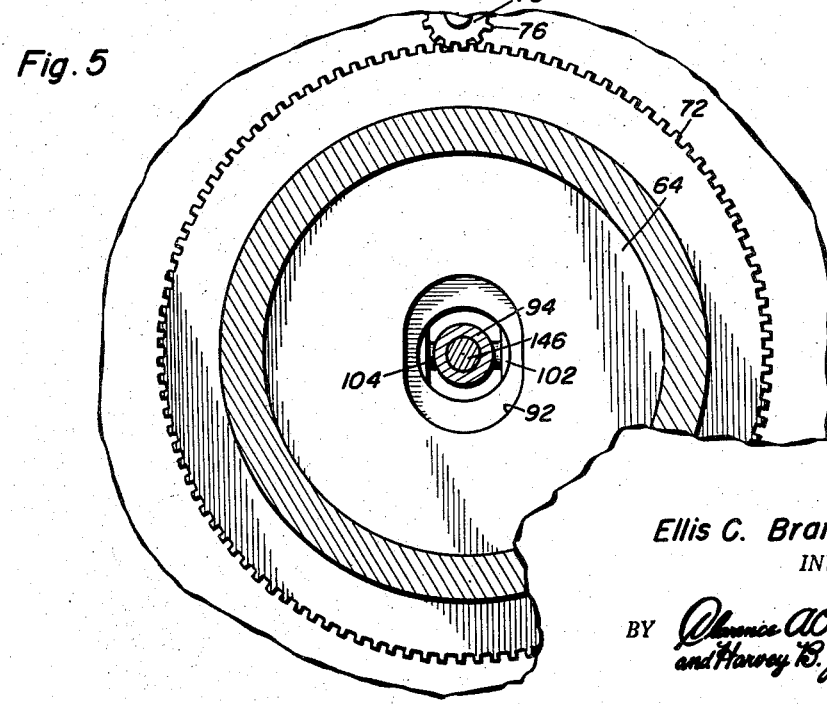
Figure 5 is a top plan sectional view taken substantially upon a plane passing along section line 5—5 of Figure 4 showing the details of construction of the enlarged gear supporting the tubular member for pivotal movement about a transverse or horizontal axis.
Figure 6:
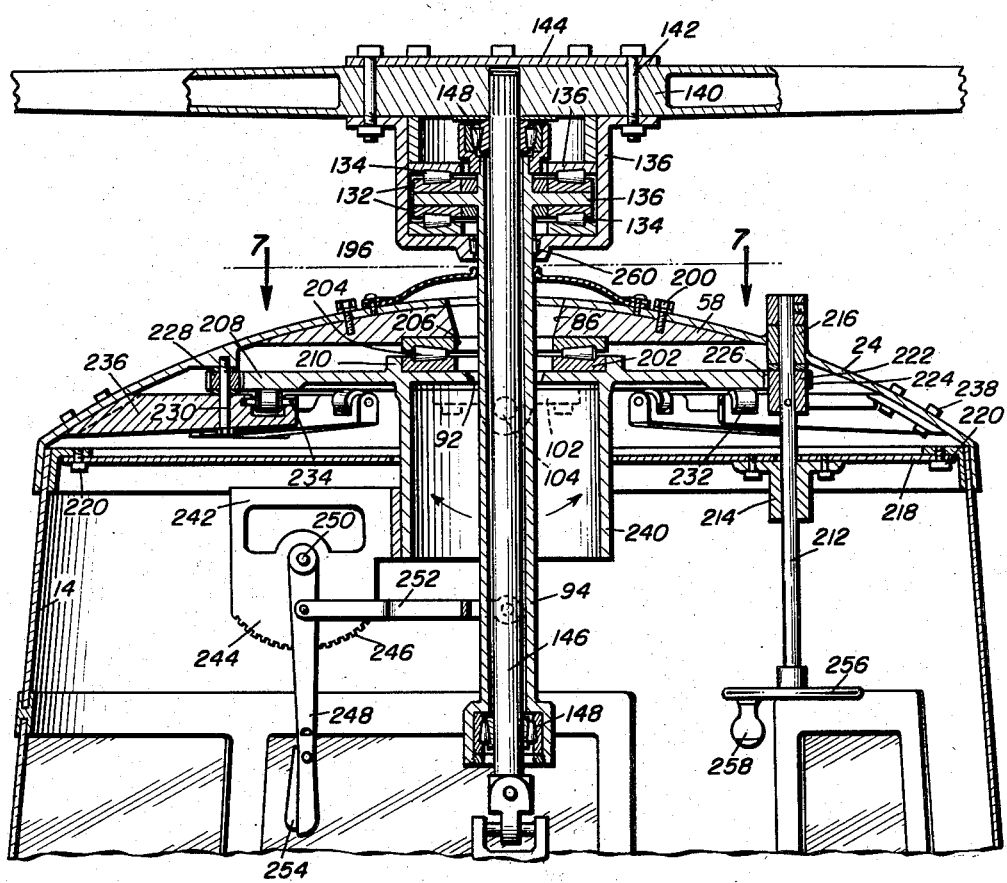
Figure 7:
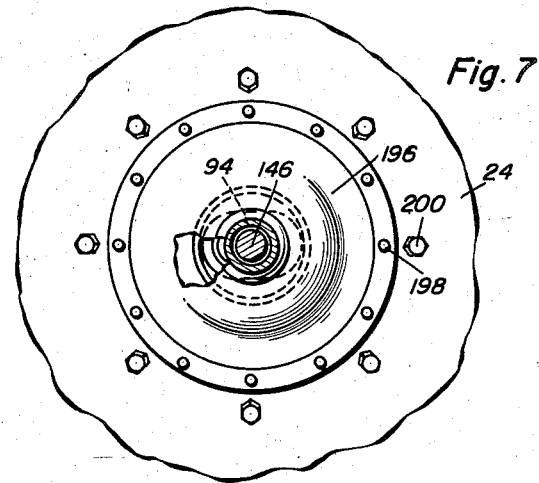

Figure 6 is a vertical sectional view similar to the upper portion of Figure 3 and Figure 4 showing the details of construction of a simplified and modified form of helicopter construction of the present invention; and Figure 7 is a plan, sectional view taken substantially upon a plane passing along section line 7—7 of Figure 6 showing the details of construction of the elongated opening permitting pivotal movement of the supporting sleeve together with the flexible closure for the opening in the upper end of the fuselage.

Referring now specifically to the drawings, it will be seen that the numeral 10 generally designates the helicopter of the present invention including a generally bell-shaped housing 12 having a peripheral wall 14 with openings 16 therein having viewing windows 18 for permitting viewing from the housing 12. An enlarged access opening 20 is provided with a door 22 for permitting access into the interior of the housing 12. The housing 12 is provided with an upper dome-shaped wall 24 and a bottom member 26 which with the peripheral wall 14 forms a complete enclosure.

On the bottom wall 26 is mounted a plurality of brackets 28 having a vertically disposed shaft 30 mounted therein together with a compression spring 32 for permitting resilient telescopic movement of the shaft 30 into the brackets 28. On the lower end of the shafts 30 is mounted a landing wheel 34 so that the helicopter 10 of the present invention may land on a suitable supporting surface such as the ground, pavement or the like. While one form of landing gear has been illustrated, namely the ground engaging wheels 34, it will be understood that other types of landing gear may be substituted depending upon the conditions encountered. For instance, pontoons may be provided for alternative use in the event the helicopter 10 will land on water such as may happen when a fishing party is transported to a location for fishing. Further, skis may be provided for use in the event the helicopter 10 may land in an area having snow or ice. These types of landing gears are not illustrated but are considered to be within the scope of the present invention.

Projecting from one side of the peripheral wall 14 is a stationary fin 36 having a plurality of upper braces 38 and a plurality of lower braces 40 which rigidly mount the fin 36 to the peripheral wall 14. Also, the inner edge of the fin 36 is disposed at right angles as designated by the numeral 42 and secured to the peripheral wall 14 by suitable fastening members 44. Pivotally secured to the outer edge of the fin 36 by hinge means 46 is a vertically elongated fin or rudder 48 together with a plurality of flexible cables 50 secured to each side thereof for attachment to a control cable 52 whereby by movement of alternative control cables 52, the angular position of the fin 48 may be adjusted thereby controlling the direction of movement of the helicopter 10 and retaining the housing 12 in substantially vertical position. The control cables 52 may be attached to a suitable control stick 54 for manipulation thereof whereby the angular position of the fin 48 may be controlled from the seat 56 on the interior of the body or fuselage 12.

As illustrated in Figure 3, the upper dome end 24 of the fuselage 12 is reinforced as indicated by the numeral 58 and includes an annular bearing race 60 engaging a plurality of tapered roller bearings 62 that engage the upper surface of an enlarged gear 64 supported on the undersurface by a plurality of tapered roller bearings 66 that are supported on a bearing race 68 on a partition or body member 70 thereby supporting the gear 64 for rotation about substantially a vertical axis. The bearings 62 and 66 engaging the respective races 60 and 68 on the fuselage 12 as well as the upper and lower surfaces of the gear 64 form a thrust bearing and also provide lateral stability for the gear 64 during its rotation.

The gear 64 is provided with teeth 72 on the peripheral surface thereof for engaging with teeth 76 on a pinion gear 78 that is attached to an elongated control rod 80 mounted in suitable bearings 82 on the partition member 70. Adjacent the lower end of the elongated handle is a pair of offset hand grips 84 for manipulation by a person sitting in the seat 56 wherein rotation of the elongated handle 80 will cause rotation of the gear 64 for a purpose described hereinafter.

The center of the reinforced portion 58 of the upper end 24 of the fuselage 12 is provided with an enlarged opening 86 that is provided with a flexible closure member 88 having a central opening 90 for a purpose described hereinafter. Also, the gear 64 is provided with a central oval-shaped opening 92 for receiving an elongated tubular sleeve 94 therethrough. It will be seen that the gear 64 is provided with a lower plate 96 integrally formed therewith together with a depending peripheral cylindrical flange 98. Attached to by fastening bolts 100 on the undersurface of the lower plate 96 is a pair of depending brackets 102 that pivotally receive oppositely projecting pivot pins 104 formed integrally with the tubular sleeve 94 wherein the horizontal axis formed by the pin 104 is perpendicular to the long diameter of the opening 92 whereby the tubular sleeve 94 may pivot about a horizontal axis formed by the pins 104 within the limits of the opening 92 in the gear 64. The opening 86 also permits angular movement of the tubular sleeve 94 in relation to the top member 24. By tilting the tubular sleeve 94 about the axis of the pivot pins 104 and then rotating the gear 64 by rotation of the handle 80, it will be seen that the tubular sleeve 94 may be adjusted in various vertically disposed and angulated planes.

Secured to the depending cylindrical portion 98 on the gear 64 is a pair of bracket members 106 and 108 which terminate in an arcuate quadrant 110 having teeth 114 on the lower surface thereof. Also projecting from the peripheral member 98 is a bracket member 116 to which an elongated handle 118 is pivotally attached. Adjacent the center of the handle 118 is pivotally connected a link 120 that is attached at its other end to the tubular sleeve 94 by pivot pin 122 that extends through a yoke 124 on the end of the link 120 wherein pivotal movement of the handle 118 will cause pivotal movement of the sleeve 94 about the axis formed by the pivot pins 104. At the end of the handle 118 at the lower extremity thereof is a pivotally mounted hand grip 126 that is connected to an elongated rod 128 having an inner end or upper end engaging the teeth 114 in the quadrant 110 and spring means is provided for continuously urging the rod 128 into engagement with the teeth 114 for locking the tubular sleeve 94 in adjusted angular position. It will be seen that the handle grip 126 of the handle 118 terminates for access by a person positioned in the seat 56 of the fuselage 12. It will be seen that the handle 118 moves with the gear 64 since it is attached to the depending flange 98 wherein rotation of the handle 80 will move the handle 118 about the interior of the fuselage 12 about a vertical axis formed by the center of the rotatable gear 64.

At the upper end of the tubular sleeve 94 is rigidly formed a peripheral flange or plate 130 that is provided with bearing races 132 on each side thereof for receiving roller bearings 134 which support plates 136 and 138 that are attached to the propeller 140 by fastening bolts 142. A plate 144 is provided on the upper surface of the propeller 140 for receiving the fastening bolts 142 thereby forming a support for the propeller 140 in both vertical directions since one set of roller bearings 134 is disposed between the plate 130 and the upper plate 136 and the lower set of roller bearings 134 is disposed between the flange plate 130 on the sleeve 94 and the lower part 138 attached to the propeller. Also secured centrally to the propeller 140 is an elongated drive shaft 146 that is rotatably received within the tubular sleeve 94 and journaled therein by a bearing 148. Also, a bearing similar to the bearing 148 and designated by the same numeral is provided at the lower end of the drive shaft 146 for supporting the lower end of the drive shaft 146 within the tubular sleeve 94 for angular movement therewith and rotational movement therein. At the lower end of the drive shaft 146 is a universal joint 150 connected to the male portion 152 of a telescopic connecting shaft 154 with the female portion designated by the numeral 156 for telescopically receiving the splined portion 158 of the male portion of the shaft 154. The lower end of the female portion 156 is provided with a universal joint 160 that is connected through flanges 162 to a stub shaft 164 having a bevel gear 166 adjacent the lower end thereof and including a pointed end 168 journaled on a suitable bearing 170. The bevel gear 166 is in meshing engagement with the bevel gear 172 on the end of a drive shaft 174 connected to a motor 176 by a suitable gearing mechanism 178 provided with an operating handle 180 wherein the speed and operation of the propeller 140 is controlled. A brake drum 180 may be provided on the shaft 174 together with a brake shoe 182 with a control cable 184 connected to a control handle 186 for controlling the rotation of the propeller 140 when the propeller 140 is not being driven by the motor 176. Also, it will be seen that the peripheral wall 14 is provided with an opening 188 having a reticulated member 190 therein for providing air for cooling and combustion to the motor 176. Also, a seat member 192 may be provided over the motor 176 for carrying a passenger and suitable control members 194 may be provided for controlling the action of the motor 176 as desired.

Referring now specifically to Figures 6 and 7 of the drawings, it will be seen that a modified form of construction is illustrated for the upper end of the fuselage 12 wherein a more compact and simplified construction is shown. All similar parts are designated by the same numerals as designated in Figures 1–5 in the drawings. As shown, the construction of the tubular sleeve 94 and the drive shaft 146 is substantially identical as is the supporting attachment between the sleeve 94 and the drive shaft 146 adjacent the propeller 140. The enlarged opening 86 is provided with a flexible closure 196 that is secured to the upper wall 24 by fastening means 198. Also, the reinforcing portion 58 is secured to the upper wall 24 by fastening bolts 200 which permit renewal of the reinforcing member 58 and also removal of all of the elements of the interior of the fuselage 12.

A thrust bearing 202 having tapered roller bearings 204 therein is positioned against the undersurface of the reinforcing member 58. The thrust bearing 202 is provided with an enlarged opening 206 similar in size to the opening 86 in the upper end 24 and the reinforcing member 58. The enlarged gear 208 is provided with an upstanding annular flange 210 surrounding the thrust bearing 202 and engaging the periphery thereof for providing lateral stability to the rotatable gear 208. Also, a shaft 212 is journaled in spaced bearings 214 and 216 with the bearing 216 supported in the upper wall surface 24 and the lower bearing 214 supported in a removable partition 218 supported by fastening bolts 220. The shaft 212 carries a gear 222 having teeth 224 in meshing engagement with the teeth 226 in the periphery of the gear 208. A similar gear 228 is mounted on a fastening bolt 230 in opposition to the gear 22 for providing lateral stability to the gear 208. If desirable, a plurality of these gears 228 may be mounted on fastening bolts 230 around the periphery of the gear 208 thereby forming lateral stability for the gear 208 and not affecting the operation thereof.

Supporting the undersurface of the gear 208 is a plurality of supporting rollers 232 with each of the rollers 232 being mounted on an axle 234 that is supported by an inwardly extending bracket 236 detachably secured to the upper wall 24 by fastening members 238. The axles 234 generally along radial lines extending from the center of the gear 208 thereby supporting the undersurface of gear 208 for rotation. As in the case of the gear 64, the gear 208 is provided with an oval-shaped opening 92 for receiving the tubular sleeve 94 and a pair of brackets 102 are provided for receiving the pivot pin 104 formed integrally with the tubular sleeve 94. A depending peripheral and cylindrical flange 240 is provided on the undersurface of the gear 208 and integrally formed therewith wherein the lower portion of the cylindrical member 240 is provided with a projecting bracket 242 in the nature of a plate having an arcuate lower edge 244 with teeth 246 thereon. An elongated pivotal handle 248 is attached centrally of the plate 242 by pivot pin 250 and a connecting link 252 extends between a central portion of the handle 248 to the sleeve 94 wherein pivotal movement of the handle 248 will pivot the sleeve 94 about pivot pins 104. A hand grip portion 254 is provided together with a dog (not shown) for engaging the teeth 246 on the plate 242 for locking the handle 248 in angularly adjusted position thereby locking the tubular sleeve 94 in angular adjusted position. Also, the handwheel 256 is mounted on the lower end of the rod 212 mounting the gear 222 for rotation of the gear 222 and a knob 258 for hand control of the handwheel 256 is provided. It will be seen that in this particular case, all of the elements of the fuselage may be removed for repair or replacement as deemed necessary.

While the handle 248 and the rod 212 are illustrated at opposite sides of the fuselage 12 for purposes of description, it will be understood that the normal position of these handles are adjacent each other since the handle 248 will rotate with the gear 208, it will be understood that in some instances, the handle 248 will be positioned remotely from the rod 212. This also is true of the embodiment of the invention as illustrated in Figures 1-5 wherein the details of the driving means in Figures 1-5 is the same as that for the embodiment illustrated in Figures 6 and 7.

Also, for the purposes of illustration, a propeller 140 has been utilized. It will be understood that any type of propeller means may be utilized such as an air wheel or the like. Further, the details of the bearing construction and the relative sizes thereof may be varied according to the strength requirements of the individual elements as determined by suitable engineering calculations.

In practical operation of both forms of the invention, the operator together with any passengers accompanying the operator will enter the fuselage 12 through the door 22 that is provided with any suitable closure latch (not shown) and be positioned on the seats 56 and 192 provided therefor. By moving the handle 54, the position of the fin or rudder 48 may be altered and the motor 176 may be started by any suitable means and connected through the various shafting for rotating the propeller 140. As the propeller 140 rotates about a true vertical axis, the helicopter 10 will be air-borne when the upward thrust of the propeller 140 overcomes the weight of the helicopter 10 together with the occupants thereof in the usual manner. After some altitude has been gained, the handle 118 or 248 may be pivoted about their respective axes for angulating the longitudinal axis of the tubular sleeve 94 with the drive shaft 146 rotating therein so that the tubular sleeve will be disposed in angular relation to the vertical axis of the fuselage 12. Due to the lengthening of the telescopic shaft 154, power will be continuously imparted to the propeller 140. When this angular position has been reached, the propeller 140 will be rotating in a plane disposed in angular relation to the true horizontal wherein the fuselage 12 will be caused to move in that direction. In other words, when the propeller 140 is disposed in an angular plane that is not a true horizontal, there will be a component of thrust in a vertical direction as well as a component of thrust in a horizontal direction wherein the helicopter 10 will move in substantially a horizontal direction when the vertical thrust is equal or slightly more than necessary to retain a constant altitude. By manipulating the handle 80, the tubular sleeve 94 may be rotated about a vertical axis of the gear 64 thereby moving the tubular sleeve 94 in a plane that generates an inverted cone whereby the plane of rotation of the propeller 140 may be adjusted completely about the center of the fuselage 12. This will permit directional control of the fuselage 12 in any direction desired and at any speed desired depending upon the degree of tilt of the plane of rotation of the propeller 140. In order to further stabilize and control the movement of the fuselage 12, the control fin 48 may be angularly adjusted as desired for compensating for cross-winds or the like.

A bearing 260 is provided between the rotatable housing 136 and the tubular sleeve 94 for stabilizing the rotation of the housing 136 when the propeller is unbalanced for any reason. While the bearing 260 is illustrated as a roller bearing, it will be understood that a ball bearing may be utilized on either form of the invention. Also, the motor 176 may be of any desirable type and horsepower and positioned in any desirable position for providing a well balanced and compact construction.

It will be seen that the device of the present invention will provide quick and easy transportation for relatively short distances for several people thereby eliminating a great deal of walking to get to inaccessible places and also eliminate traveling on crowded highways by other vehicles. In all instances, suitable lubrication fittings may be provided as well as other safety devices normally found in aircraft of this type.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a helicopter, a fuselage, means mounted adjacent the bottom of said fuselage for engaging a supporting surface, propeller means for moving said fuselage through the air, said propeller means being mounted on the upper end of the fuselage, means mounted in said fuselage for driving said propeller means, means mounted within the fuselage for controlling the direction of movement, and means mounted in said fuselage for adjusting the plane of rotation of said propeller means, an elongated tubular sleeve projecting through the upper end of the fuselage and rotatably supporting said propeller means, an enlarged gear rotatably supported at the upper end of the fuselage and having a centrally disposed elongated opening receiving said sleeve, means mounting the sleeve on said gear for pivotal movement about a horizontal axis, and means interconnecting the gear and fuselage for rotating said gear about a vertical axis thereby permitting the plane of rotation of the propeller means to be tilted universally in relation to the upper end of the fuselage and partially forming said means for adjusting the plane of rotation of the propeller means, a pivotally mounted handle depending from said gear, a link interconnecting said handle and sleeve for adjusting the sleeve about a horizontal axis and forming the remainder of the last mentioned means, said means for engaging a supporting surface comprising a plurality of spring-cushioned landing wheels, said fuselage being generally bell-shaped with an access door and viewing windows in the periphery thereof, said means for controlling the movement of the fuselage including a rudder fin pivotally attached to said fuselage for movement about a vertical axis, and an actuating lever in said fuselage and connected to the fin for moving said fin, said means for driving said propeller means including a motor mounted in said fuselage, a flexible drive shaft interconnecting said motor and propeller means for driving said propeller means in various planes of rotation, said drive shaft being rotatably journaled in said sleeve, said enlarged gear being in meshing engagement with a pinion gear, and means for rotating said pinion gear for rotating said gear about a vertical axis.

2. In a helicopter, a fuselage, means mounted adjacent the bottom of said fuselage for engaging a supporting surface, propeller means for moving said fuselage through the air, said propeller means being mounted on the upper end of the fuselage, means mounted in said fuselage for driving said propeller means, means mounted within the fuselage for controlling the direction of movement, and means mounted in said fuselage for adjusting the plane of rotation of said propeller means, an elongated tubular sleeve projecting through the upper end of the fuselage and rotatably supporting said propeller means, an enlarged gear rotatably supported at the upper end of the fuselage and having a centrally disposed elongated opening receiving said sleeve, means mounting the sleeve on said gear for pivotal movement about a horizontal axis, and means interconnecting the gear and fuselage for rotating said gear about a vertical axis thereby permitting the plane of rotation of the propeller means to be tilted universally in relation to the upper end of the fuselage and partially forming said means for adjusting the plane of rotation of the propeller means, a pivotally mounted handle depending from said gear, a link interconnecting said handle and sleeve for adjusting the sleeve about a horizontal axis and forming the remainder of the last mentioned means, said means for engaging a supporting surface comprising a plurality of spring-cushioned landing wheels, said fuselage being generally bell-shaped with an access door and viewing windows in the periphery thereof, said means for controlling the movement of the fuselage including a rudder fin pivotally attached to said fuselage for movement about a vertical axis, and an actuating lever in said fuselage and connected to the fin for moving said fin, said means for driving said propeller means including a motor mounted in said fuselage, a flexible drive shaft interconnecting said motor and propeller means for driving said propeller means in various planes of rotation, said drive shaft being rotatably journaled in said sleeve, said enlarged gear being in meshing engagement with a pinion gear, and means for rotating said pinion gear for rotating said gear about a vertical axis, said gear being supported on a plurality of circumferentially spaced rollers, said rollers mounted on axles disposed on radial lines extending from the center of the gears.

3. In a helicopter having a fuselage with an opening in the upper wall thereof, an enlarged plate-like member mounted in the fuselage for rotation about a vertical axis, said plate-like member having a central opening therein in general alignment with the opening in the fuselage, an elongated sleeve extending through said openings, means pivotally connecting said sleeve to said plate-like member for movement about a horizontal axis, rotor means journalled on the upper end of said sleeve, means interconnecting the sleeve and plate-like member for retaining the sleeve in angularly adjusted position about the horizontal axis, means interconnecting the fuselage and plate-like member for retaining the plate-like member in angularly adjusted position about the vertical axis thereby universally adjusting the plane of rotation of said rotor means, and drive means extending through the sleeve and connected with said rotor means for driving the same and propelling the helicopter.

4. In a helicopter, a fuselage having an opening in the upper wall thereof, an enlarged plate member having a central opening therein, means interconnectnig the plate member and fuselage supporting the plate member for rotation about a vertical axis with the opening in the plate in vertical alignment with the opening in the upper wall of the fuselage, the opening in the plate being oval-shaped and the opening in the upper wall of the fuselage having a diameter at least equal to the major axis of the oval-shaped opening, an elongated sleeve extending through said openings for rotatably receiving a propeller shaft having a propeller on the upper end thereof and drive means connected with the lower end, means interconnecting the sleeve and plate member supporting the sleeve for pivotal movement about a horizontal axis substantially parallel to the minor axis of the oval-shaped opening in the plate for swinging movement in a vertical plane for disposing the propeller in an angular plane, means interconnecting the plate member and sleeve for adjusting the sleeve about the horizontal axis and releasably locking the sleeve in adjusted position, and means interconnecting the plate member and fuselage for rotating the plate member about its vertical axis of rotation for rotating the sleeve in relation to the sleeve for varying the vertical plane of swinging movement of the sleeve and drive shaft whereby the inclined plane of rotation of the propeller may be adjusted for directional control of the fuselage.

References Cited in the file of this patent
UNITED STATES PATENTS

| | | |
|---|---|---|
| 968,860 | Kummer | Aug. 30, 1910 |
| 1,804,869 | Gambarini | May 12, 1931 |
| 2,404,014 | Thornes | July 16, 1946 |
| 2,589,030 | Alde | Mar. 11, 1952 |